(12) United States Patent
Hawaka et al.

(10) Patent No.: US 10,484,951 B2
(45) Date of Patent: Nov. 19, 2019

(54) CONTROLLING ANTENNA OUTPUT POWER

(71) Applicant: Lenovo (Singapore) Pte. Ltd., Singapore (SG)

(72) Inventors: Shigekazu Hawaka, Kanagawa (JP); Masaki Oie, Tokyo (JP); Masahide Tamura, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 179 days.

(21) Appl. No.: 13/912,285

(22) Filed: Jun. 7, 2013

(65) Prior Publication Data

US 2013/0331046 A1    Dec. 12, 2013

(30) Foreign Application Priority Data

Jun. 8, 2012 (JP) .................. 2012-130618

(51) Int. Cl.
*H01Q 11/12* (2006.01)
*H04W 52/18* (2009.01)
*H04W 52/28* (2009.01)
*H04B 17/10* (2015.01)

(52) U.S. Cl.
CPC .......... *H04W 52/18* (2013.01); *H04B 17/102* (2015.01); *H04W 52/283* (2013.01)

(58) Field of Classification Search
CPC .... H04W 52/367; H04W 52/283; G01S 19/51
USPC ........................ 455/77, 114.1, 317
See application file for complete search history.

(56) References Cited

U.S. PATENT DOCUMENTS

| | | | | |
|---|---|---|---|---|
| 2009/0253459 | A1* | 10/2009 | Naganuma | H04B 1/0475 455/556.1 |
| 2012/0077538 | A1* | 3/2012 | Yun | H04B 1/3838 455/522 |
| 2012/0231784 | A1* | 9/2012 | Kazmi | H04B 1/3838 455/423 |
| 2013/0122827 | A1* | 5/2013 | Ali et al. | 455/77 |

FOREIGN PATENT DOCUMENTS

| | | |
|---|---|---|
| JP | 2011526099 A | 9/2011 |
| WO | 2009149023 A1 | 12/2009 |

OTHER PUBLICATIONS

Federal Communications Commission OET Laboratory Division, "RF Exposure Procedures Update", Oct. 2010, 36 pages, online publication, available at URL:http://transition.fee.gov/oet/ea/presentations/files/oct10/SAR_RF_Exposure_Procedures_Updates_101910-KC.pdf, as of Jun. 7, 2013.

* cited by examiner

*Primary Examiner* — Tu X Nguyen
(74) *Attorney, Agent, or Firm* — Ference & Associates LLC

(57) ABSTRACT

An embodiment provides a information handling device, including: one or more processors; one or more antennas, a communication element, and a memory device that stores instructions executed by the one or more processors, the instructions being executable by the one or more processors to: recognize a location within which the information handling device is operating through wireless communication received via the communication element; and modulate, based on which location the information handling device is operating within, a dynamic power reduction of transmission power through the antenna.

18 Claims, 5 Drawing Sheets

| MCC (COUNTRY) | "COEXISTENCE" FLAG | FREQUENCY BAND | ENABLE DPR FUNCTION | REDUCTION AMOUNT |
|---|---|---|---|---|
| 283 (UNITED STATES) | × | GSM 850 | ○ | xxx |
| | | GSM 1900 | ○ | xxx |
| | | WCDMA Band II | ○ | xxx |
| | | WCDMA Band V | ○ | xxx |
| 262 (GERMANY) | × | GSM 900 | | 0 |
| | | GSM 1800 | | 0 |
| | | WCDMA Band I | | 0 |
| | | WCDMA Band VIII | | 0 |
| 505 (AUSTRALIA) | × | GSM 900 | | 0 |
| | | GSM 1800 | | 0 |
| | | WCDMA Band I | | 0 |
| | | WCDMA Band V | | 0 |
| *** (******) | ○ | **** *** | | 0 |
| | | **** *** | | 0 |
| | | **** *** | ○ | xxx |
| | | **** *** | | 0 |

FIG. 3

CONTROLLING ANTENNA OUTPUT POWER

CLAIM FOR PRIORITY

This application claims priority to Japanese patent application serial number 2012-130618 which is incorporated by reference herein.

FIELD

The subject matter described herein relates to a technique for automatically reducing antenna output power of an information handling device (e.g., a wireless terminal device) as an SAR-related measure and, more particularly, to a technique for reducing the antenna output power so as to comply with the SAR regulations set in each country.

BACKGROUND

Wireless terminal devices such as laptop personal computers, tablet terminal devices, and smartphones are equipped with wireless communication devices for wireless WAN, wireless LAN, etc. Electromagnetic waves radiated from an antenna may have adverse effects on a human body in proximity to the antenna. The Federal Communications Commission (FCC) of the U.S. Government and the pertinent organizations in other countries have set permitted levels of electromagnetic energy that is allowed to be absorbed into human beings, given in terms of a unit referred to as the specific absorption rate (SAR). The SAR is a measure of the amount of electromagnetic energy absorbed in a human body per unit time per unit mass.

In the United States, Canada, Taiwan and the like, the SAR limit with respect to local exposure of a human body is set to 1.6 W/kg averaged over 1 gram of living tissue. In several countries in Europe and Oceania, the SAR limit is set to 2.0 W/kg averaged over 10 grams of living tissue. Presently, there are countries that have no specific SAR limits in place. In order to meet the SAR standards set in various countries, some wireless terminal devices are equipped with a so-called dynamic power reduction (DPR) function which, when detecting that a human body is in proximity to an antenna, automatically reduces the electromagnetic energy radiated from the antenna.

Japanese Patent Application Laid-Open No. 2003-209483 shows a technique for reducing the SAR in a mobile communication device. When a sensor senses that the mobile communication device is in proximity to a human body, a controller reduces at least one of the average power and the duration of the radio frequency electromagnetic energy radiated by the mobile communication device. Japanese Patent Application Laid-Open No. 2006-340180 describes a method for controlling the SAR in a portable terminal device equipped with a plurality of antennas, while suppressing degradation of communication quality. In the wireless terminal device, the antenna to be disabled is determined by detecting the display orientation, the holding orientation, or the installation status.

Japanese Patent Application Laid-Open No. 2010-045698 describes a tablet computer which stops transmission from an antenna when the approach of a human body is detected on the basis of the reception power of a spurious signal, in order to clear the SAR-related problems. *RF Exposure Procedures Update*, Federal Communications Commission, OET Laboratory Division TCB workshop online publication, October 2010, describes an SAR measurement method taking DPR into consideration is available on the Internet at the following URL:http://transition.fcc.gov/oet/ea/presentations/files/oct10/SAR_RF_Exposure_Procedures_Updates_101910-KC.pdf.

BRIEF SUMMARY

The foregoing is a summary and thus may contain simplifications, generalizations, and omissions of detail; consequently, those skilled in the art will appreciate that the summary is illustrative only and is not intended to be in any way limiting.

In summary, one embodiment provides an information handling device, comprising: one or more processors; one or more antennas; a communication element; and a memory device that stores instructions executed by the one or more processors, the instructions being executable by the one or more processors to: recognize a location within which the information handling device is operating through wireless communication received via the communication element; and modulate, based on which location the information handling device is operating within, a dynamic power reduction of transmission power through the antenna.

Another embodiment provides a method, comprising: recognizing, using communications received via a communication element of an information handling device, a location within which the information handling device is operating; and modulating, based on which location the information handling device is operating within, a dynamic power reduction of transmission power through an antenna of the information handling device.

A further embodiment provides a computer program product comprising: a computer readable storage medium having computer readable program code embodied therewith, the computer readable program code comprising: computer readable program code configured to recognize a location within which the information handling device is operating through wireless communication received via the communication element; and computer readable program code configured to modulate, based on which location the information handling device is operating within, a dynamic power reduction of transmission power through the antenna.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 shows an example of a DPR table 109.

DETAILED DESCRIPTION

Figure 1A:
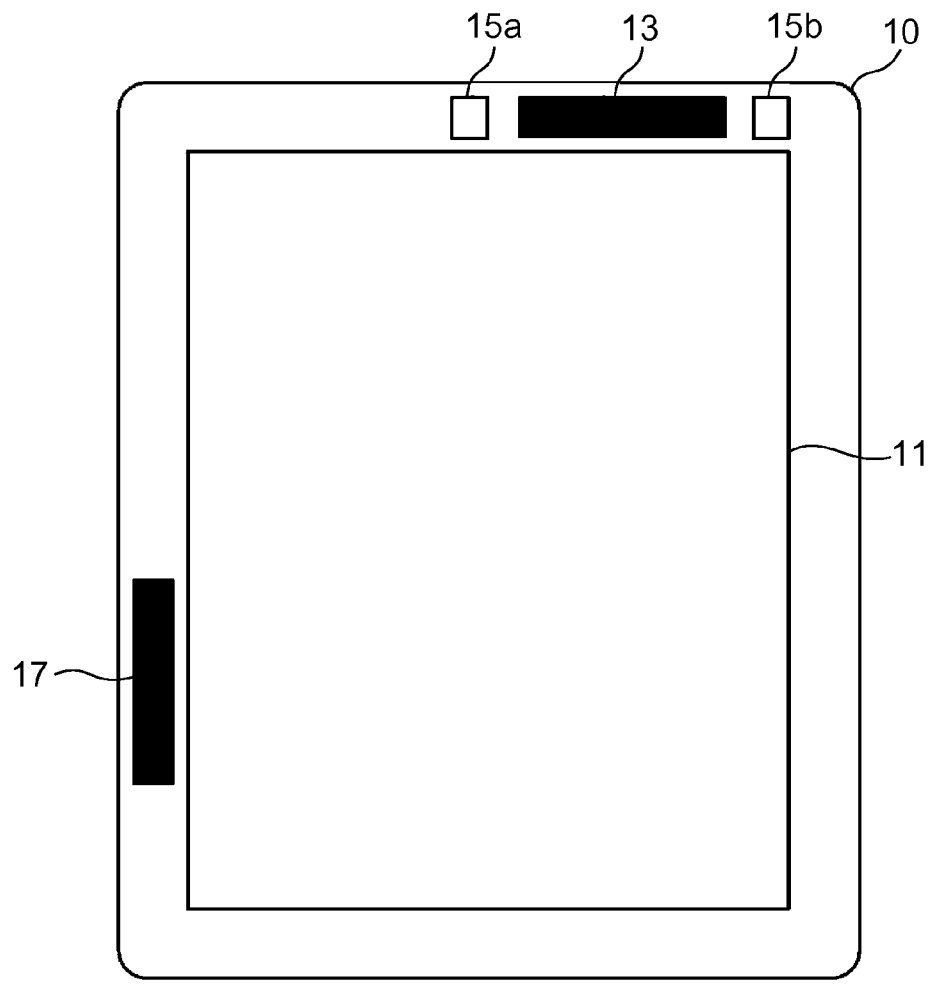
FIGS. 1A and 1B show the appearance of a tablet terminal device 10.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

At the present time, the SAR limits are set by laws of each country; there are no uniform standards. A greater SAR limit value as well as a greater body tissue mass as a test object means less strict regulation. In a country with less strict regulation, the SAR standards can be met with no need of executing the DPR function. The wireless terminal devices to be sold around the world may be equipped with the DPR function as standard, and the function may be automatically disabled in the country where it is unnecessary to use the DPR function. This can advantageously reduce the number of components as well as cost.

Currently, however, the DPR function is enabled or disabled in accordance with the frequency band being used in communication, rather than in accordance with the standards set in each country. Therefore, in the case where it is necessary to enable the DPR function for a certain frequency band in a country that has adapted strict SAR standards, the DPR function will be automatically enabled for the same frequency band even in a country with less strict standards, resulting in unnecessary reduction in output power of the transmitting antenna.

Furthermore, if there is a change in communication method, expansion of the frequency band for use, or a change in SAR standards in some countries in the future, a situation may arise where the DPR function needs to be enabled in some frequency bands while it can be disabled in other frequency bands in a single country. As a result, there may occur more commonly the state where the setting of enabling or disabling the DPR function with respect to a same frequency band varies in different countries. With the currently available methods of setting the DPR function, in the frequency band where the SAR standards vary among different countries, the DPR function needs to be enabled preferentially. This means that the device used in a country with less strict regulation will inevitably suffer degradation of communication quality.

In view of the foregoing, an embodiment provides a method for causing transmission power of a wireless module to comply with the SAR regulations set in each country, while avoiding unnecessary reduction in communication quality. A further embodiment provides a method to enable or disable for causing a function of reducing the transmission power when a human body is in proximity to a transmitting antenna in a wireless terminal device to be enabled or disabled for each country. A still further embodiment provides a method for controlling the transmission power, when a human body is in proximity to a transmitting antenna in a wireless terminal device, so as to comply with the SAR regulations set in each country. Yet another embodiment provides a wireless terminal device and a computer program which implement the above-described methods.

Another embodiment provides a wireless terminal device which is provided with a function of automatically reducing transmission power of a wireless module when a human body has approached a transmitting antenna. Such a function is for example called DPR. Reducing the transmission power makes it possible for the device to comply with the SAR regulations even if a human body approaches the antenna. The wireless terminal device includes: the transmitting antenna; the wireless module that outputs a high-frequency signal to the transmitting antenna; and a control unit that automatically enables or disables the function of reducing the transmission power by recognizing a country in which the wireless terminal device is operating.

With this configuration, in the country in which it is unnecessary to enable the function of reducing the transmission power, the transmission power is prevented from being reduced when a human body approaches the transmitting antenna. As an example, the approach of a human body may be detected by a proximity sensor which is disposed near the transmitting antenna. The country in which the wireless terminal device is operating may be recognized for example on the basis of information received from a wireless base station with which the device is being connected. Alternatively, the country in which the device is operating may be recognized by the GPS installed in the wireless terminal device. The information received from the wireless base station may be for example a mobile country code (MCC) included in the radio waves transmitted from the wireless base station. When the wireless base station transmits another type of information indicating the country, such information may be used as well.

In some countries, the function of reducing the transmission power cannot be enabled or disabled for all the frequency bands used in that country. According to one embodiment, in the case where the function of reducing the transmission power can be enabled or disabled for each of the frequency bands in one country, it is possible to enable or disable the function by further recognizing the band of frequencies being used for communication with the wireless base station. A reference table may be provided which includes, for each of a plurality of countries, information indicating whether to enable or disable the function of reducing the transmission power and a reduction amount of the transmission power, and the function may be enabled or disabled by referring to the reference table.

In a tablet terminal device, the distance between the transmitting antenna and human tissue is short. By using one embodiment, it is possible to effectively satisfy both the compliance with the SAR regulations and the maintenance of good communication quality. Further, in a wireless WAN, standards have been established for initial transmission power at the initiation of connection. One embodiment can be applied to effectively take the SAR-related measures. It is noted that one embodiment is also applicable to a communication method other than the wireless WAN for which regulations have been set in terms of SAR.

Another embodiment provides a wireless terminal device which, when detecting the approach of a human body to a transmitting antenna, controls transmission power on the basis of a country in which the device is operating. The wireless terminal device includes: the transmitting antenna; a wireless module that outputs a high-frequency signal to the transmitting antenna; a proximity sensor disposed near the transmitting antenna and detecting the approach of a human body; and a control unit configured to recognize the country in which a wireless base station with which the wireless terminal device is being connected is located, and, in response to detection of the approach of a human body to the transmitting antenna, to control the output power of the wireless module on the basis of the country recognized.

With a further embodiment, it has become possible to provide a method for causing transmission power of a wireless module to comply with the SAR regulations set in each country, while avoiding unnecessary reduction in communication quality. Further, with one embodiment, it has become possible to provide a method for causing the function of reducing the transmission power when a human body is in proximity to a transmitting antenna in a wireless terminal device to be enabled or disabled for each country. Still further, with one embodiment, it has become possible to provide a method for controlling the transmission power, when a human body is in proximity to a transmitting antenna in a wireless terminal device, so as to comply with the SAR regulations set in each country. Still further, with an embodiment, it has become possible to provide a wireless terminal device and a computer program which implement the above-described methods.

Figure 1B:
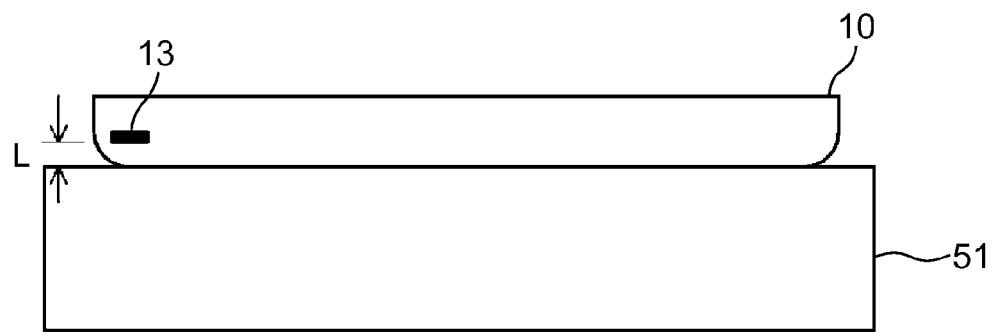

FIGS. 1A and 1B are a plan view and a side view, respectively, of a tablet terminal device 10. The tablet terminal device 10 has a touch screen 11 provided on a surface at the center, and a main antenna 13 for wireless WAN, proximity sensors 15a and 15b, and an auxiliary antenna 17 for wireless WAN provided inside a casing at the peripheral portion. A WiFi antenna, a camera, and other components, not shown, are also disposed inside the casing at the peripheral portion.

The main antenna 13 is used for transmission and reception, while the auxiliary antenna 17 is used solely for reception. At the time of reception, the main antenna 13 and the auxiliary antenna 17 are switched for use by a diversity system. The tablet terminal device 10 is thin. When a user operates the device while sitting on a chair and placing the device on top of the thigh 51, as shown in FIG. 1B, the main antenna 13 comes closest to the thigh 51 as human tissue, with a shortest distance L therebetween.

The SAR of the tablet terminal device 10 is obtained as follows. The power of the electromagnetic energy is scanned over a prescribed range of the thigh 51 and measured at a plurality of locations to calculate the average thereof. In order for the tablet terminal device 10 to meet the SAR standards set in each country, the shorter the distance L is, the smaller the transmission power should be made. In a wireless WAN, the output power from a transmitting antenna during the initial operation of connecting with a wireless base station is preset. Therefore, with a lower SAR limit, the antenna output power needs to be decreased by a greater amount when a human body approaches the antenna.

Figure 2:
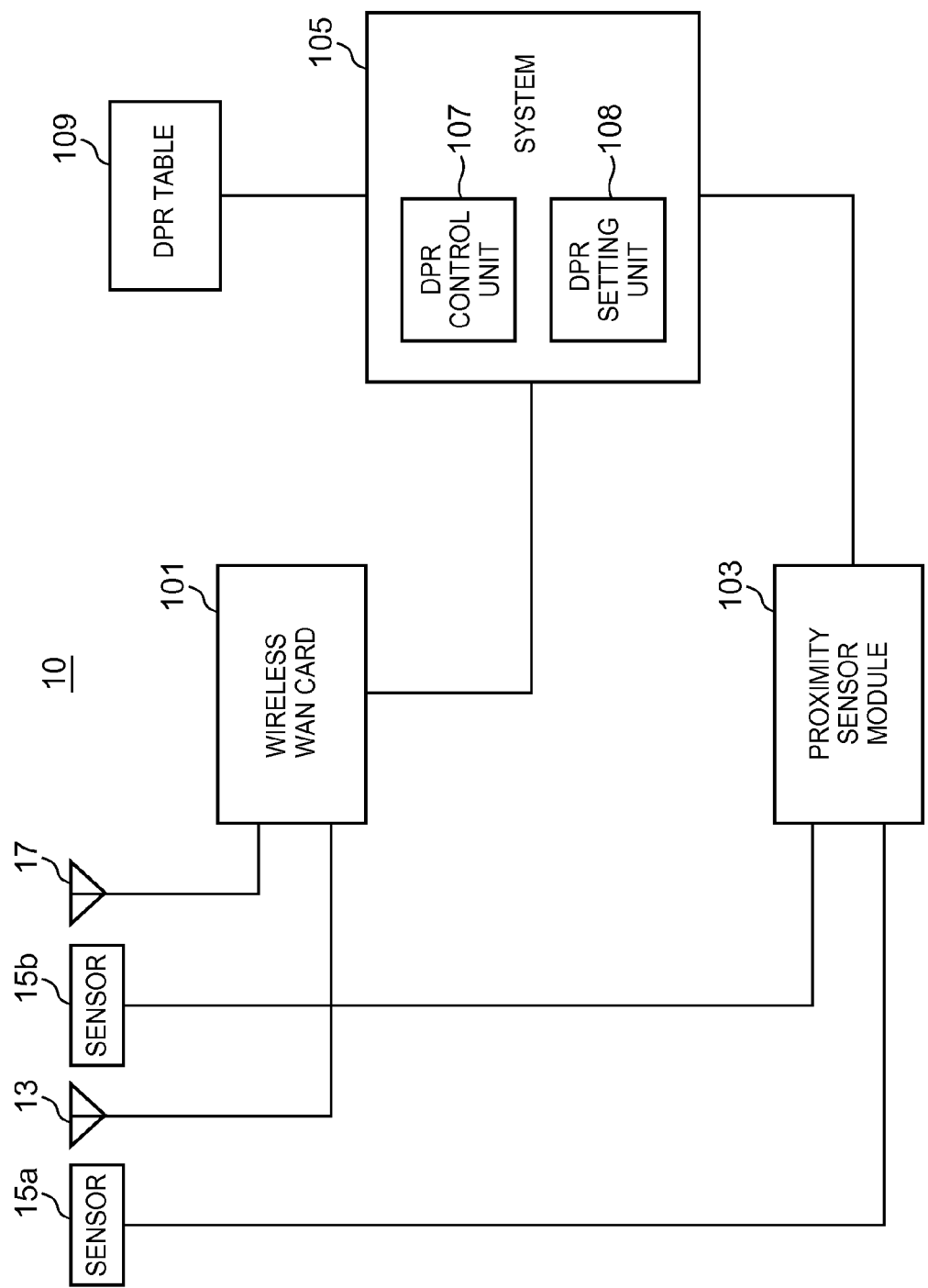
FIG. 2 is a functional block diagram showing the schematic configuration of the tablet terminal device 10.

FIG. 2 is a functional block diagram showing the schematic configuration of the tablet terminal device 10. A wireless WAN card 101 supports both second generation (2G) and third generation (3G) communication standards. The wireless WAN card 101 is connected with the main antenna 13 and the auxiliary antenna 17. The wireless WAN card 101 is connected to a system 105, and converts high-frequency signals propagated through the transmitting antenna 13 and the receiving antenna 17 to data signals to be processed by the system 105, and vice versa.

The proximity sensors 15a and 15b are electrodes for detecting capacitance. The sensors are connected to a proximity sensor module 103. The proximity sensor module 103 is of a capacitive type, by way of example. It detects a change in capacitance when a human body approaches the proximity sensor(s) 15a and/or 15b, and outputs the detected change to a DPR control unit 107. The system 105 is composed of hardware including a CPU, a main memory, a chip set, and an SSD, and software including an operating system, an application program, and a device driver.

Part of the system 105 constitutes the DPR control unit 107 and a DPR setting unit 108. The DPR control unit 107 includes a DPR control program for implementing a DPR function of automatically reducing the transmission power of the wireless WAN card 101 by a prescribed value when a signal indicating the approach of a human body is received from the proximity sensor module 103. The DPR control program is an application program executed by the CPU.

The DPR setting unit 108 is a storage area reserved in part of the main memory for enabling the DPR function. A DPR table 109 stores data for the DPR control unit 107 to disable the DPR function. The DPR table 109 is stored in the SSD while the tablet terminal device 10 is off, and is read to the main memory when the wireless WAN card 101 operates.

When the wireless WAN card 101 has established a connection with a wireless base station, the DPR control unit 107 sets the DPR setting unit 108, by default, so as to enable the DPR function. The DPR control unit 107 clears the DPR setting unit 108 and disables the DPR function, if possible, on the basis of the data in the DPR table 109 and an MCC which is obtained from the wireless WAN card 101 and which indicates the country in which the wireless base station with which the device is being connected at the point in time is located.

The present embodiment does not exclude the configuration in which the DPR control unit 107 clears the DPR setting unit 108, by default, to disable the DPR function when the wireless WAN card 101 has established a connection. In such a case, however, a certain measure against the approach of a human body to the transmitting antenna 13 will have to be taken until the DPR function is enabled. The DPR control unit 107 may then set the DPR setting unit 108 to enable the DPR function, when necessary, on the basis of the MCC and the data in the DPR table 109.

FIG. 3 shows an example of the DPR table 109. The DPR table 109 includes: MCC, "coexistence" flag, frequency band, the necessity to enable the DPR function, and the reduction amount (dBm) of the output power of the transmitting antenna when the DPR function is enabled. The DPR table 109 is created by the manufacturer of the tablet terminal device 10 and stored in the SSD in advance. The MCC is an identification code of a three-digit number indicating the country in which a wireless base station is located. The MCC is included in the radio waves transmitted from the wireless base station. The "coexistence" flag indicates that a frequency band in which the DPR function needs to be enabled and a frequency band in which the DPR function can be disabled coexist in one country.

When the tablet terminal device 10 is subjected to experiments based on the SAR permitted values set in various countries in which the device is to be used and sold, at the present time, the results indicate either to enable or disable the DPR function for all the frequency bands in one country. For example, in the United States and Canada where the SAR limit is 1.6 W/kg (averaged over 1 g), the DPR function needs to be enabled for all the frequency bands. In some countries in Europe and Oceania where the SAR limit is 2.0 W/kg (averaged over 10 g), the DPR function can be disabled for all the frequency bands.

Therefore, at the present time, it is unnecessary to set the "coexistence" flag in the DPR table 109, as shown for the United States, Germany, and Australia by way of example. The directional characteristics of a transmitting antenna, however, change depending on the frequency bands. For a new frequency band, the judgment of necessity of the DPR function may vary in different countries. Furthermore, as the absorption rates of electromagnetic energy in a human body vary depending on the radiation frequencies, the regulations being set in each country may be replaced with new regulations set elaborately for different frequency bands. The "coexistence" flag has been prepared to cope with the case, expected in the future, where a frequency band in which the DPR function needs to be enabled and a frequency band in which the DPR function can be disabled coexist in one country.

The reduction amount is the amount by which the transmission power of the wireless WAN card 101 is reduced from the initial value at the time of connection with a wireless base station, in order to meet the SAR permitted value set in each country. The reduction amount is determined through experiments in advance. In the DPR table 109, the transmission power for each country or for each set of country and frequency band may be registered, instead of the reduction amount from the initial value. The reduction amount may vary in different countries for a same frequency band, or it may vary in different frequency bands in a single country. Therefore, the reduction amount is determined for each frequency band in which the DPR function needs to be enabled. It is noted that if the reduction amount is equal for all the frequency bands in a country where no "coexistence" flag has been set, it is unnecessary to register the frequency bands for that country in the DPR table 109.

With the conventional methods of enabling or disabling the DPR function on the basis of frequency bands alone, for example in the case of using the WCDMA Band V in the United States and Australia, as the DPR function needs to be enabled in the United States, the DPR function would also be enabled in Australia where it could be disabled. In the present embodiment, the DPR function is set in the following manner, so that the undesirable situation as described above can be avoided and, hence, unnecessary degradation in performance during communication can be prevented.

Figure 4:
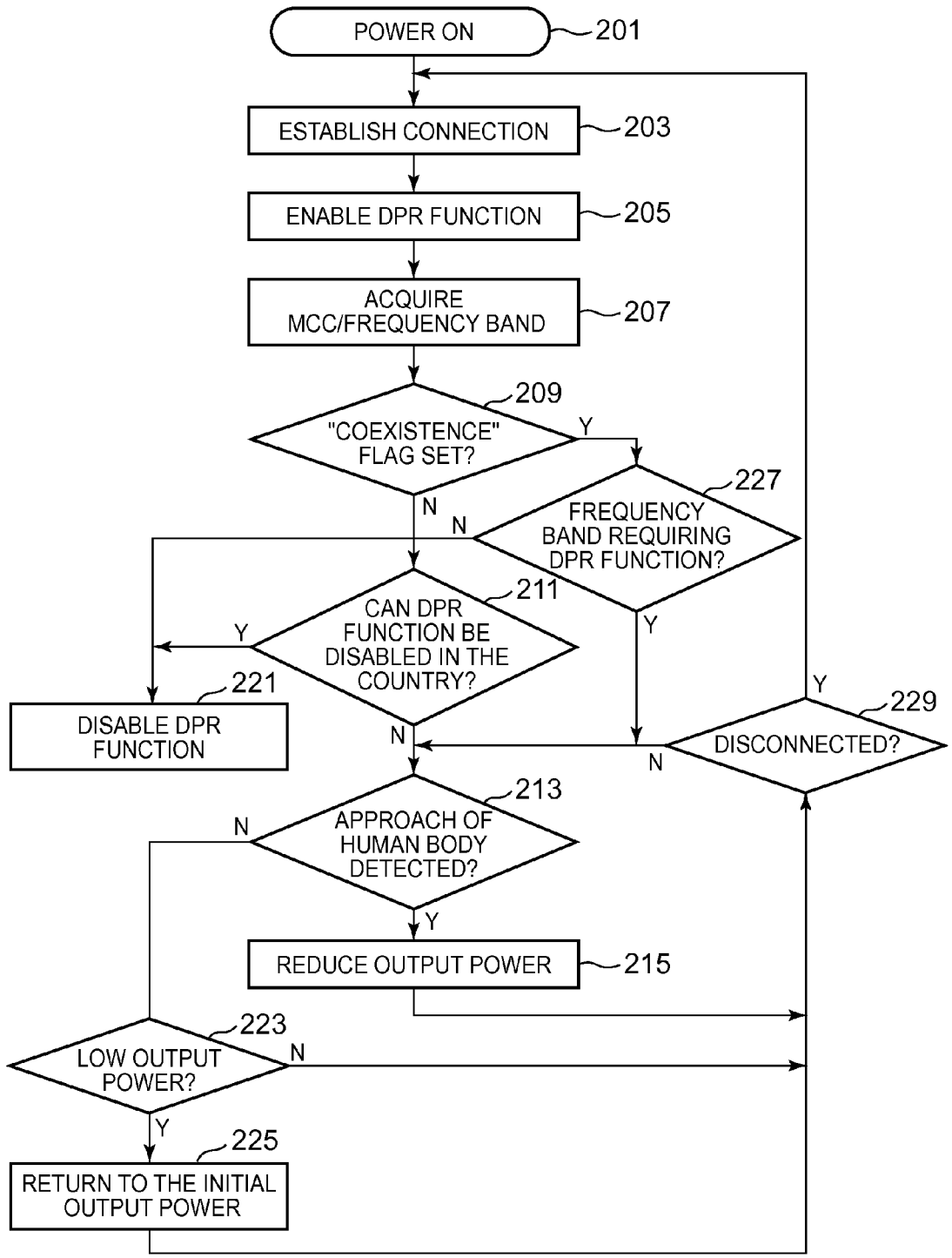
FIG. 4 is a flowchart illustrating the procedure for the tablet terminal device 10 to set a DPR function.

FIG. 4 is a flowchart illustrating the procedure for the tablet terminal device 10 to set the DPR function. In block 201, the tablet terminal device 10 is turned on. Then, in block 203, the wireless WAN card 101 receives a pilot signal transmitted from a wireless base station, and performs negotiation and authentication before establishing a connection. While the wireless WAN card 101 operates at predetermined initial transmission power, once the DPR function is enabled, thereafter, the DPR control unit 107 instructs the wireless WAN card 101 to reduce the transmission power or return it to the initial value, in accordance with a signal received from the proximity sensor module 103.

In block 205, immediately after the connection has been established, the DPR control unit 107 always sets the DPR setting unit 108 to enable the DPR function. In block 207, the wireless WAN card 101 acquires the MCC indicating the country in which the tablet terminal device 10 is operating, from the radio waves transmitted from the wireless base station, and informs the DPR control unit 107 of the MCC. The DPR control unit 107 also acquires, from the wireless WAN card 101, information about the frequency band being used.

In block 209, the DPR control unit 107 refers to the DPR table 109 to see whether the "coexistence" flag has been set for the country corresponding to the acquired MCC. This step may be skipped in the case where no "coexistence" flag has been set for any country in the DPR table 109. If no "coexistence" flag has been set corresponding to the acquired MCC, the process proceeds to block 211; otherwise, the process proceeds to block 227. In block 211, the DPR control unit 107 refers to the DPR table 109 to determine whether it is possible to disable the DPR function for the country corresponding to the acquired MCC.

If it is possible to disable the DPR function, the process proceeds to block 221, where the DPR control unit 107 clears the DPR setting unit 108 to disable the DPR function. When the DPR function is disabled, thereafter, the DPR control unit 107 will not instruct the wireless WAN card 101 to reduce the output power even if the proximity sensor module 103 detects the approach of a human body. In the case where the country in which the tablet terminal device 10 is used or the frequency band used is changed later, the wireless communication is disconnected in block 229. In such a case, the process returns to block 203, and the DPR control unit 107 determines again whether it is possible to disable the DPR function.

If the DPR control unit 107 determines in block 211 that it is not possible to disable the DPR function, the process proceeds to block 213, with the setting of the DPR setting unit 108 being maintained. In block 213, the proximity sensor module 103 may detect the approach of a human body. If no approach of a human body is detected, the process proceeds to block 223. If the approach is detected, the process proceeds to block 215, and the proximity sensor module 103 outputs a signal indicating the approach of a human body, to the DPR control unit 107.

In block 223, the DPR control unit 107 determines whether the transmission power of the wireless WAN card 101 is currently low as it was reduced in the preceding block 215. If the transmission power has not been reduced, i.e. if it has not been changed from the initial transmission power, the process proceeds to block 229. If the transmission power has already been reduced, the process proceeds to block 225. In block 225, the DPR control unit 107 instructs the wireless WAN card 101 to return the transmission power of the main antenna 13 to the initial value, and the process proceeds to block 229.

In block 215, when the DPR control unit 107 refers to the DPR setting unit 108 and confirms that the DPR function is active, then the DPR control unit 107 instructs the wireless WAN card 101 to reduce the transmission power by the reduction amount corresponding to the frequency band currently used, which amount is acquired from the DPR table 109. When the transmission power is reduced, the tablet terminal device 10 comes to meet the SAR standards set in the relevant country for the relevant frequency band. In block 229, the DPR control unit 107 monitors the wireless WAN card 101 to see whether the wireless communication has been disconnected. If so, the process returns to block 203. As long as the wireless connection is maintained, the process returns to block 213, where the transmission power of the main antenna 13 is controlled in accordance with the presence/absence of the approach of a human body, with the DPR function being active.

In block 227, the DPR control unit 107 refers to the DPR table 109 to see whether it is possible to disable the DPR function for a set of the country in which the wireless base station with which the device is currently connected is located and the frequency band which is currently used for communication with the wireless base station. If it is possible to disable the DPR function, the process proceeds to block 221. If it is necessary to enable the DPR function, the process proceeds to block 213, with the setting of the DPR setting unit 108 being maintained.

Figure 5:
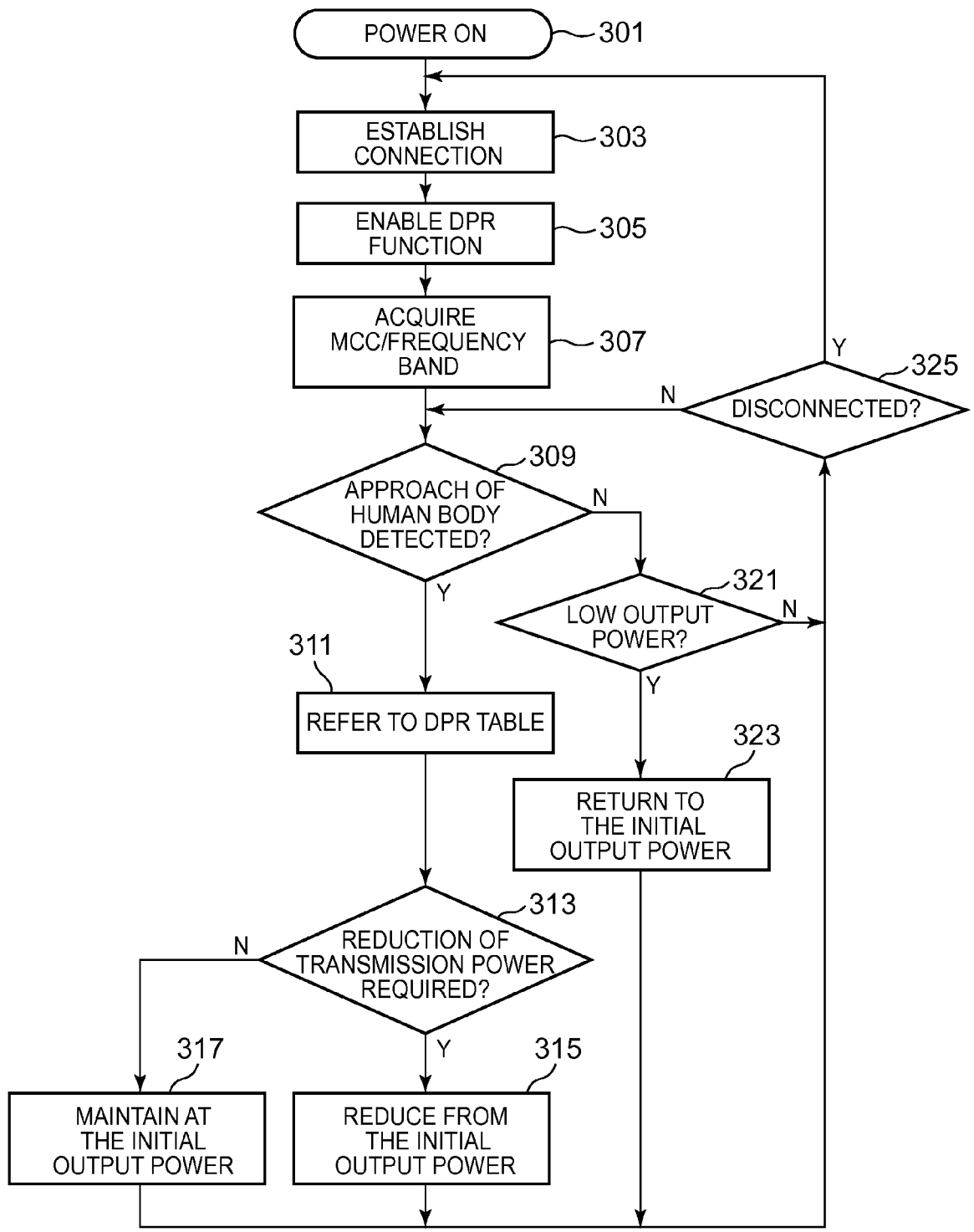
FIG. 5 is a flowchart illustrating the procedure for controlling transmission power on the basis of an MCC and the DPR table 109.

FIG. 5 is a flowchart illustrating the procedure for controlling the transmission power on the basis of the MCC and the DPR table 109. In this example, the DPR setting unit 108 shown in FIG. 2 is not provided. Each time the approach of a human body is detected, the DPR table 109 is referred to, and the transmission power of the wireless WAN card 101 is kept at or reduced from the current level, so as to meet the SAR standards set in each country to the necessary extent. Blocks 301, 303, 305, and 307 are identical to blocks 201, 203, 205, and 207, respectively, in FIG. 4. In the present procedure, due to the absence of the DPR setting unit 108, the DPR function is not ever disabled.

In block 309, the proximity sensor module 103 may detect the approach of a human body. If the approach of a human body is detected, the process proceeds to block 311, and the proximity sensor module 103 outputs a signal indicating the approach, to the DPR control unit 107. If the approach is not detected, the process proceeds to block 321. The DPR control unit 107 refers to the DPR table 109 in block 311, and, in block 313, determines whether it is necessary to reduce the transmission power on the basis of the country corresponding to the MCC or on the basis of a set of the country corresponding to the MCC and the frequency band now in use.

When the DPR control unit 107 refers to the DPR table 109 and determines that it is necessary to reduce the transmission power, the process proceeds to block 315. If it is determined that it is unnecessary to reduce the transmission power, the process proceeds to block 317, where the transmission power is maintained at the initial output power. The process then proceeds to block 325. In block 315, the DPR control unit 107 instructs the wireless WAN card 101 to reduce the transmission power by the reduction amount registered in the DPR table 109. The process then proceeds to block 325.

In block 325, the process returns to block 309 as long as the connection is maintained. When the connection is terminated, the process returns to block 303. In block 321, the DPR control unit 107 determines whether the transmission power of the wireless WAN card 101 is currently low. If not, i.e. if the transmission power is maintained at the initial level, the process proceeds to block 325. If the transmission power has already been reduced, the process proceeds to block 323. In block 323, the DPR control unit 107 instructs the wireless WAN card 101 to return the transmission power of the main antenna 13 to the initial level, and the process proceeds to block 325.

While the present embodiment has been described by taking as an example the 2G and 3 G communication standards, the present embodiment is also applicable to a wireless terminal device which is equipped with a wireless LAN card and a wireless WAN card complying with the fourth generation (4G) communication standards called "long term evolution (LTE)". Still alternatively, the present embodiment is applicable to a wireless terminal device which is equipped with a wireless card complying with all of the 2G, 3G, and 4 G communication standards.

Further, while the MCC has been described as an example of the information used by the tablet terminal device to recognize the country in the above embodiment, the present embodiment may use information other than the MCC as long as it can identify the country in which the wireless base station to which the device is connected is located. For example, in the case where a wireless base station transmits, to the tablet terminal device 10 connected thereto, information other than the MCC that allows the device to recognize the country, the information may be used. Still alternatively, the GPS function included in the tablet terminal device 10 as standard equipment may be used to recognize the country in which the tablet terminal device 10 is located.

The GPS function may be used alone, or it may be used in addition to the MCC, as the information for identifying the country in which the tablet terminal device 10 is operating. Further, while the tablet terminal device 10 which is thin and having a short distance L from the thigh is suitable for applying the present embodiment to make it comply with the SAR regulations, the present embodiment is applicable, not only to the tablet terminal device, but also to a laptop personal computer, a large-sized smartphone, and other wireless terminal devices.

While one transmitting antenna has been provided in the present embodiment, for example in the case where more than one transmitting antenna is used by utilizing the transmission technology called "MIMO", the proximity sensor may be provided for each transmitting antenna, and the transmission power may be controlled and reduced for each transmitting antenna. The way of detecting the approach of a human body does not have to be restricted to the use of the capacitive-type proximity sensor; an infrared-type proximity sensor or a spurious signal described in Patent Document 3 may be used as well.

While the present embodiment has been described with reference to specific embodiments shown in the accompanying drawings, it goes without saying that the present embodiment is not limited to the embodiments shown in the drawings, and any configuration known to date can be adopted as long as it produces the effects of the present embodiment.

What is claimed is:

1. An information handling device, comprising:
   one or more processors;
   one or more antennas;
   one or more proximity sensors disposed near the one or more antennas;
   a communication element; and
   a memory device that stores instructions executed by the one or more processors, the instructions being executable by the one or more processors to:
   recognize a geographic location within which the information handling device is operating through wireless communication received via the communication element, said wireless communication including a code identifying the geographic location;
   set a specific absorption rate (SAR) limit for the information handling device based on the code identifying the geographic location, wherein the SAR limit for the information handling device is modified for different geographic locations;
   enabling a dynamic power reduction function of the information handling device, wherein the enabling comprises determining a frequency band the information handling device is communicating on and enabling the dynamic power reduction function when the frequency band would result in a SAR above the SAR limit, wherein the dynamic power reduction function is not enabled when the frequency band would not result in a SAR above the SAR limit, wherein the enabling a dynamic power reduction function is based upon a coexistence flag identified in a table, wherein a set coexistence flag indicates a frequency band that the dynamic power reduction function should be enabled;

identify, responsive to enabling the dynamic power reduction function, a power of electromagnetic energy transmitted by the one or more antennas with respect to a human body; and modulate, based on the SAR limit and the identified power of electromagnetic energy, the dynamic power reduction function to modulate transmission power through the one or more antennas, wherein to modulate comprises dynamically modifying the transmission power through the antenna as the distance between the human body and the one or more antennas changes to adjust the SAR of the information handling device for the frequency band.

2. The information handling device of claim 1, wherein the communication element comprises a wireless module operating at a frequency band for a wireless WAN.

3. The information handling device of claim 2, wherein the instructions being executed further comprise instruction to recognize the geographic location within which the information handling device is operating based on a frequency band used for communication with a wireless base station.

4. The information handling device of claim 1, wherein the communication element comprises a global positioning satellite (GPS) module, wherein to recognize a geographic location within which the information handling device is operating through wireless communication received via the communication element comprises recognizing the geographic location within which the information handling device is operating based on output from the GPS module.

5. The information handling device as in claim 1, wherein the information handling device is a tablet terminal device.

6. The information handling device as in claim 1, further comprising a reference table including, for each of a plurality of countries, information indicating the geographic location within which the information handling device is operating.

7. The information handling device of claim 2, wherein the instructions being executed further comprise instruction to recognize the geographic location within which the information handling device is operating based on information received from a wireless base station.

8. The information handling device of claim 7, wherein the information received from the wireless base station is a mobile country code (MCC).

9. The information handling device of claim 1, wherein a geographic region within a country has a different SAR value for different frequency bands within the geographic region.

10. A method, comprising:

recognizing, using communications received via a communication element of an information handling device, a geographic location within which the information handling device is operating, said wireless communication including a code identifying the geographic location;

setting a specific absorption rate (SAR) limit for the information handling device based on the code identifying the geographic location, wherein the SAR limit for the information handling device is modified for different geographic locations;

enabling a dynamic power reduction function of the information handling device, wherein the enabling comprises determining a frequency band the information handling device is communicating on and enabling the dynamic power reduction function when the frequency band would result in a SAR above the SAR limit, wherein the dynamic power reduction function is not enabled when the frequency band would not result in a SAR above the SAR limit, wherein the enabling a dynamic power reduction function is based upon a coexistence flag identified in a table, wherein a set coexistence flag indicates a frequency band that the dynamic power reduction function should be enabled;

identifying, responsive to enabling the dynamic power reduction function, a power of electromagnetic energy transmitted by the one or more antennas with respect to a human body; and modulating, based on the SAR limit and the identified power of electromagnetic energy, the dynamic power reduction function to modulate transmission power through the one or more antennas, wherein to modulate comprises dynamically modifying the transmission power through the antenna as the distance between the human body and the one or more antennas changes to adjust the SAR of the information handling device for the frequency band.

11. The method of claim 10, wherein the communication element comprises a wireless module operating at a frequency band for a wireless WAN.

12. The method of claim 11, wherein the recognizing a location further comprises recognizing the geographic location within which the information handling device is operating based on information received from a wireless base station.

13. The method of claim 11, wherein the recognizing a location further comprises recognizing the geographic location within which the information handling device is operating based a frequency band used for communication with a wireless base station.

14. The method of claim 10, wherein the communication element comprises a global positioning satellite (GPS) module, wherein to recognize a geographic location within which the information handling device is operating through wireless communication received via the communication element comprises recognizing the geographic location within which the information handling device is operating based on output from the GPS module.

15. The method of claim 10, wherein the information handling device is a tablet terminal device.

16. The method of claim 10, wherein the recognizing a location further comprises using a reference table including, for each of a plurality of countries, information indicating the geographic location within which the information handling device is operating.

17. The method of claim 12, wherein the information received from the wireless base station is a mobile country code (MCC).

18. A computer program product comprising:

a computer readable storage device having computer readable program code embodied therewith, the computer readable program code being executable by a processor and comprising:

computer readable program code that recognizes a geographic location within which the information handling device is operating through wireless communication received via the communication element, said wireless communication including a code identifying the geographic location;

computer readable program code that sets a specific absorption rate (SAR) limit for the information handling device based on the code identifying the geographic location, wherein the SAR limit for the information handling device is modified for different geographic locations;

computer readable program code that enables a dynamic power reduction function of the information handling device, wherein the enabling comprises determining a frequency band the information handling device is communicating on and enabling the dynamic power reduction function when the frequency band would result in a SAR above the SAR limit, wherein the dynamic power reduction function is not enabled when the frequency band would not result in a SAR above the SAR limit, wherein the computer readable program code that enables a dynamic power reduction function is based upon a coexistence flag identified in a table, wherein a set coexistence flag indicates a frequency band that the dynamic power reduction function should be enabled;

computer readable program code that identifies, responsive to enabling the dynamic power reduction function, a power of electromagnetic energy transmitted by the one or more antennas with respect to a human body; and computer readable program code that responsive to the determination, modulates, based on the SAR limit and the identified power of electromagnetic energy, the dynamic power reduction function to modulate transmission power through the one or more antennas, wherein to modulate comprises dynamically modifying the transmission power through the antenna as the distance between the human body and the one or more antennas changes to adjust the SAR of the information handling device for the frequency band.

* * * * *